June 26, 1923.
C. C. CODDING
1,459,823
DRILLING DEVICE
Filed Sept. 30, 1921    2 Sheets-Sheet 2
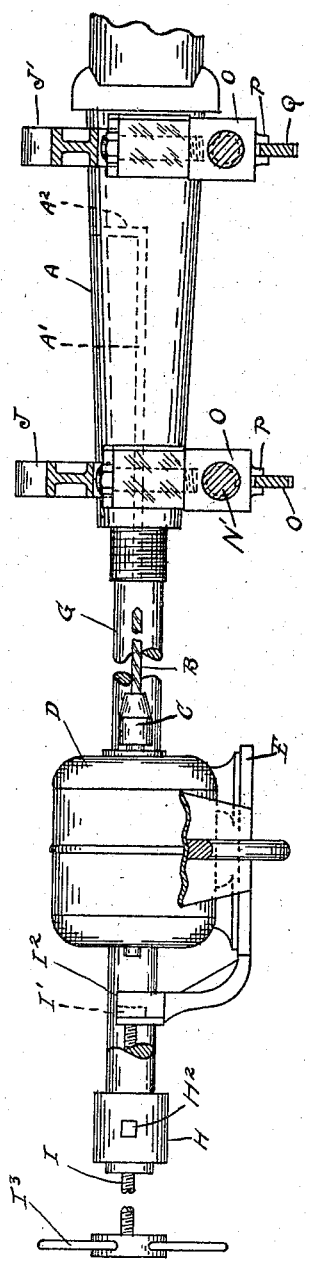
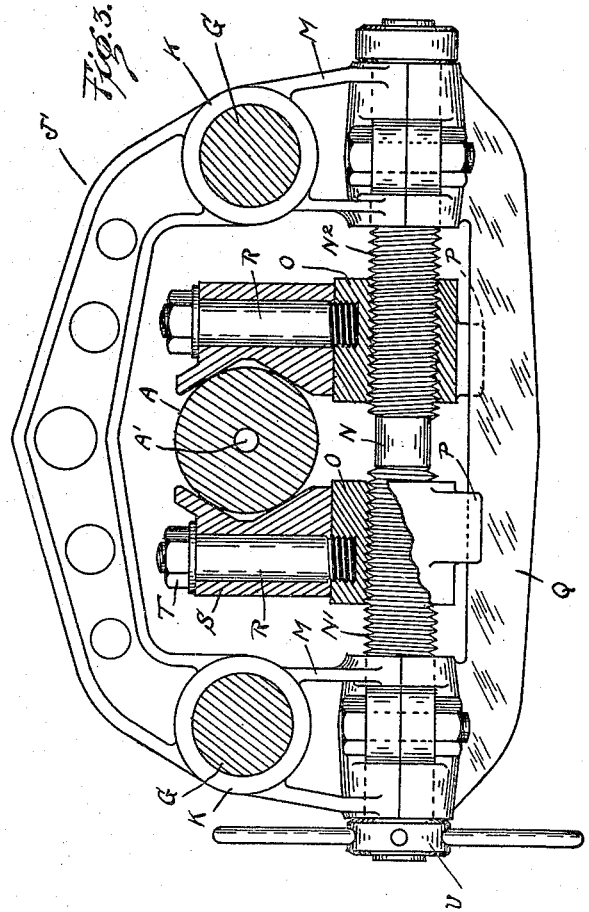
Inventor
Chester C. Codding
By Whittemore, Hulbert, Whittemore, and Belknap
Attorneys Patented June 26, 1923.

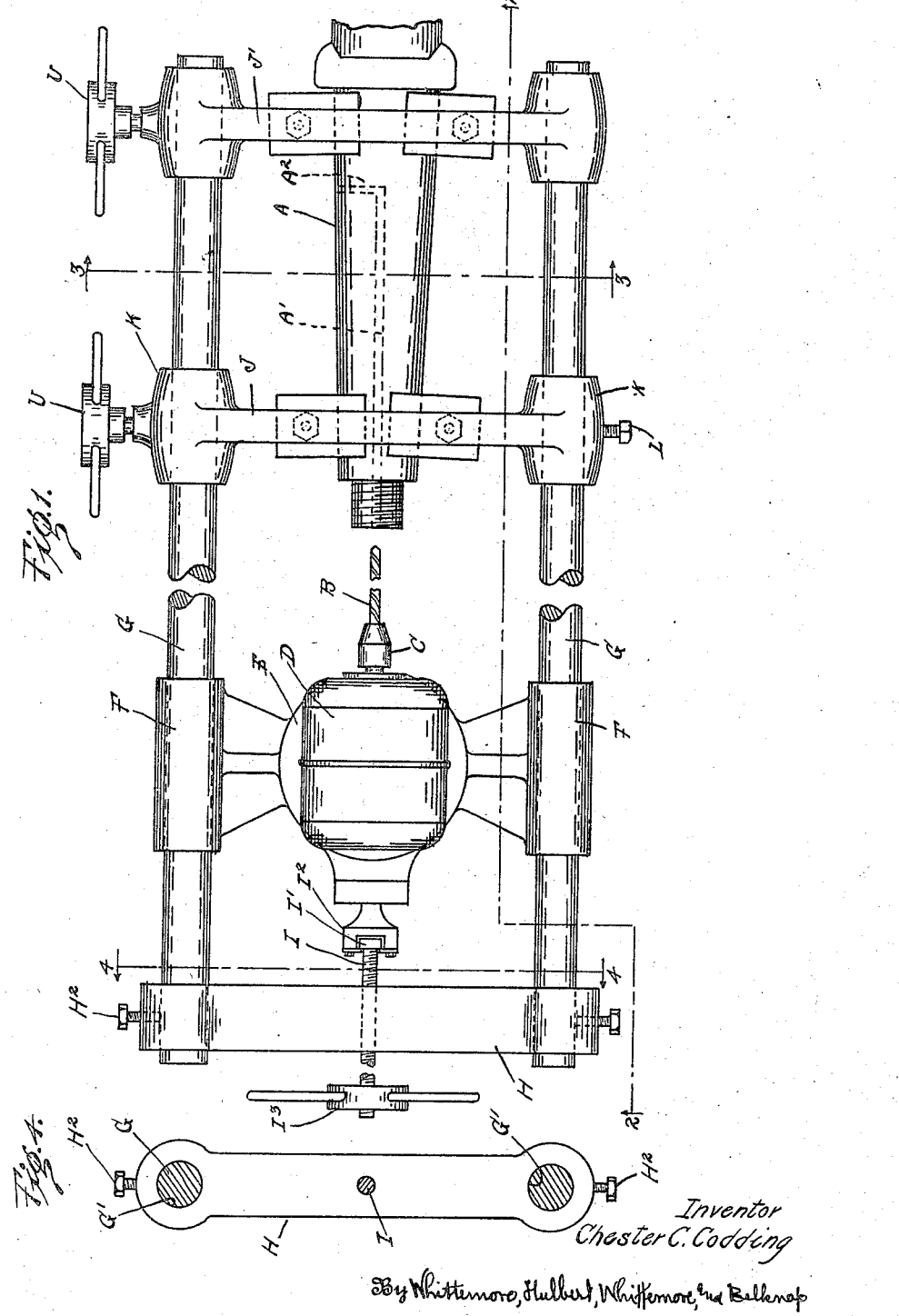

1,459,823

UNITED STATES PATENT OFFICE.

CHESTER C. CODDING, OF DETROIT, MICHIGAN, ASSIGNOR OF ONE-HALF TO GEORGE T. HUNTER, OF DETROIT, MICHIGAN.

DRILLING DEVICE.

Application filed September 30, 1921. Serial No. 504,292.

*To all whom it may concern:*

Be it known that I, CHESTER C. CODDING, a citizen of the United States of America, residing at Detroit, in the county of Wayne and State of Michigan, have invented certain new and useful Improvements in Drilling Devices, of which the following is a specification, reference being had therein to the accompanying drawings.

The invention relates to drilling devices and more particularly to devices for drilling axle bores in spindles or the like.

It is the object of the invention to provide a drill mounting having means for clamping the same upon a spindle (such as an axle spindle of a vehicle) for the purpose of drilling an axle bore in said spindle, the engagement of said clamping means with the spindle effecting accurate alignment of the drill with the spindle.

A further object of the invention is to provide a device of the character described in which the clamping means is particularly designed to engage a spindle tapered either wholly or in part, and to effect an accurate axial alignment of the drill with the spindle regardless of the length and diameter of the spindle or the degree of its taper or the specific location of the taper.

In the drawings:

Figure 1 is a plan view of the improved drilling device showing the same mounted upon a tapered vehicle axle spindle;

Figure 2 is a longitudinal vertical section on line 2—2 of Figure 1;

Figure 3 is a cross sectional view taken on line 3—3 of Figure 1;

Figure 4 is a cross sectional view taken on line 4—4 of Figure 1.

In these views, the reference character A designates the gradually tapered spindle of a vehicle axle, the purpose of the invention being to form in said spindle an axial bore such as is indicated at A' in Figure 1, said bore forming a passage for lubricant which is ejected through a radial bore $A^2$, the formation of the latter being, however, no function of the present invention. B indicates a drill for forming the bore A' and the primary utility of the invention is to quickly establish said drill in a position of proper axial alignment with the spindle. The drill B is engaged in a chuck C carried by the shaft of the motor D and in practicing the invention, said motor is mounted upon a platform E oppositely terminating in integral parallel sleeves F slidably engaging a pair of parallel guide rods G. H is a bar establishing a rigid connection between the rods G, said bar being formed with the parallel bores G' in its ends for engaging said rods, and the set screws $H^2$ being employed to hold said bar fixed upon said rods. I is a feed screw engaging in the bar H mid-way between the rods G and having at its forward end the head I' engaging the projection $I^2$ from the base E, the other end of said feed screw being provided with a handle $I^3$ for operating said screw. Thus upon rotating said screw by means of said handle, the motor support E slides forward or back upon the rods G.

Adjacent its other end portion, the rods G are rigidly connected by a pair of spaced yoke members J and J' which are integrally formed with the sleeves K embracing said rods. The forward yoke member J' is permanent in its relation to said rods and may be held fixed upon the latter by fitting sufficiently tight. The member J is preferably adjustable longitudinally upon the rods G, being held in adjustment by a set screw L. Each yoke member J and J' is formed with depending portions M below the sleeves K in which portions is journalled the extremities of a right and left hand screw N, the reversely threaded portions N' and $N^2$ of said screw being respectively engaged with the nuts O which when said screw is rotated are shifted to or from each other according to the direction of rotation. Said nuts are restrained from rotation by the spaced lugs P, a pair of which depends from each nut engaging a guide bar Q integrally connecting the portions M of each yoke member. Each nut O is rigidly engaged by a post R, the lower end of which may be threaded to engage the corresponding nut. Each post R has a swivel mounting for a clamping member S, the co-acting pairs of said clamping members having their opposing faces of an approximate V shape as best shown in Figure 3. Above the clamping members S the posts R are engaged by nuts T to hold the clamping members in place. The journal portions of the screws N project slightly from the bearing M at one side of the device to receive the actuating handles N whereby said screws may be selectively rotated.

In mounting the described device upon a the spindle of a vehicle axle, the latter is first engaged below the yoke members J and J' and the handles U are successively turned to feed the clamping members S into opposing engagement with said spindle. The V-shaped form of the bearing faces of said clamping members insures establishment of a horizontal level for the drill mounting such as will locate the axis of the drill in the horizontal plane of the spindle axis. Also, as the clamping members of each pair are fed toward each other, they are maintained by the right and left handed screw constantly equi-distant from the axis of the drill B so that when said members are finally established in proper clamping engagement with the spindle, the latter is accurately located in the vertical plane of the drill. The swivel mounting of the clamping members S upon the nuts O permits said clamping members to adjust themselves to the taper of the spindle A so as to bear upon said spindle throughout their width. Also said swivel mounting permits said clamping members to adjust themselves to properly engage spindles of varying tapers. Since the two pairs of clamping members S are independently adjustable, they may engage portions of a tapered spindle considerably differing in diameter. The adjustability of the yoke member K longitudinally upon the rods G permits the two pairs of clamping members to be transversely spaced according to the length of the spindle upon which the drilling device is to be mounted. The described adjustments are highly desirable in view of the fact that manufacture of the vehicle spindles is not standardized, various makers employing different degrees of taper and some even employing different tapers on the same spindle. The described clamping means is such as to be engageable with any spindle regardless of its degree of taper or the location of the taper. When the device is properly clamped upon the spindle, it is necessary only to energize the motor D and feed the drill B axially into the spindle A by means of the screw I. The employment of the described device accomplishes a considerable saving of time and labor in properly mounting a drill to form an axial bore in a tapering spindle.

What I claim as my invention is:

1. A portable drilling device comprising a drill, a mounting for said drill composed of spaced bars, means carried by said mounting for clamping and supporting the same upon a spindle, said means axially aligning the drill and spindle, and means for rotating the drill and feeding the same toward the spindle.

2. A portable drilling device comprising a drill and a mounting for said drill composed of spaced bars, a pair of clamping members adjustably carried by said bars for supporting the same upon the work, a common means for adjusting said clamping members to or from each other, and means for rotating said drill and for feeding the same toward said clamping members.

3. A portable drilling device comprising a drill and a mounting for the same composed of spaced bars, a pair of clamping members slidably carried by said bars for supporting the same upon the work, and a common means for adjusting said clamping members to or from the drill axis in constant equidistant relation to said axis, and means for rotating said drill and for feeding the same toward said clamping members.

4. A portable drilling device comprising a drill and a mounting for said drill composed of spaced bars, a pair of clamping members adjustably carried by said bars for supporting the latter upon the work, and a screw journalled in said mounting transversely thereof having reversely threaded portions respectively engaging said clamping members for adjusting the latter in common to or from said axis and maintaining said clamping members equidistant from said axis, and means for rotating said drill and feeding the same toward said clamping members.

5. A portable drilling device comprising a drill, a mounting for said drill composed of spaced bars, two pairs of clamping members slidably carried by said mounting for supporting the same upon a spindle, means for independently adjusting the members of each of said pairs to or from each other and transversely of the axis of the drill, and means for rotating said drill and feeding the same toward said clamping members.

6. A portable drilling device comprising a drill, a mounting for said drill composed of spaced bars, a pair of clamping members slidably carried by said mounting for supporting the latter upon the work, means for adjusting the clamping members of each pair in unison to or from the axis of the drill in equidistant relation to said axis, and means for rotating said drill and feeding the same toward said clamping members.

7. A portable drilling device comprising a drill, a bar mounting for said drill, a pair of clamping members slidably carried by said mounting for supporting the latter upon the work, members relatively adjustable to or from the axis of the drill in equi-distant relation to said axis swivelly carrying said clamping members, a common means for adjusting said supporting members to or from the drill axis in constant equidistant relation to said axis, and means for rotating the drill and feeding the same toward said clamping members.

8. A drilling device comprising a pair of parallel bars, a drill rotatably mounted upon said bars, means slidably engaging and rigidly spacing said bars, a pair of clamping members mounted upon the bars, means for adjusting the clamping members to or from the axis of the drill in equidistant relation to said axis, and means for rotating the drill and feeding the same to or from said clamping members.

9. A drilling device comprising a pair of parallel spaced bars, bracket members slidably engaging and rigidly spacing said bars, a drill rotatably carried by said bars parallel to and equidistant therefrom, a pair of clamping members, means carried by the bars for adjusting the clamping members, to or from the axis of the drill, maintaining said members equidistant from said axis, and means for rotating the drill and feeding the same to or from said clamping members.

10. A drilling device comprising a pair of parallel bars, a platform slidably mounted upon said bars, a motor carried by said platform between the bars, a drill rotatably driven by the motor, means carried by said bars for feeding said platform longitudinally of the bars, a yoke member rigidly connecting the bars, a right and left hand screw journalled in said yoke member transversely of the bars, nuts engaging the reversely threaded portions of said screws, a guide member carried by the yoke member engaged by said nuts to constrain the latter from rotation, and a pair of co-acting clamping members carried by said nuts for mounting the drilling device upon a spindle.

11. A drilling device comprising a pair of parallel bars, a platform slidably mounted upon said bars, a motor carried by said platform between the bars, a drill rotatably driven by the motor, means carried by said bars for feeding said platform longitudinally of the bars, a yoke member rigidly connecting the bars, a threaded member journalled in said yoke member, adjustable members mounted on said threaded member, a guide member carried by the yoke member engaged by said adjustable members to constrain the latter from rotation, and a pair of co-acting clamping members carried by said adjustable members for mounting the drilling device upon the work.

In testimony whereof I affix my signature.

CHESTER C. CODDING.